(No Model.)  5 Sheets—Sheet 1.
G. F. CARLIE.
CIGARETTE MACHINE.

No. 546,063.  Patented Sept. 10, 1895.

WITNESSES:
Frank S. Ober
G. W. Baldwin.

INVENTOR
G. F. Carlie.
BY
Fowler & Fowler
ATTORNEYS.

(No Model.) 5 Sheets—Sheet 2.

G. F. CARLIE.
CIGARETTE MACHINE.

No. 546,063. Patented Sept. 10, 1895.

WITNESSES:
INVENTOR

ATTORNEYS (No Model.)  5 Sheets—Sheet 3.

G. F. CARLIE.
CIGARETTE MACHINE.

No. 546,063. Patented Sept. 10, 1895.

WITNESSES:
Frank S. Ober.
G. R. Baldwin.

INVENTOR
G. F. Carlie.
BY
Fowler & Fowler.
ATTORNEYS.

(No Model.)

G. F. CARLIE.
CIGARETTE MACHINE.

No. 546,063.  Patented Sept. 10, 1895.

5 Sheets—Sheet 4.

WITNESSES:
Frank S. Ober
G. R. Baldwin

INVENTOR
G. F. Carlie.
BY
Fowler & Fowler
ATTORNEYS.

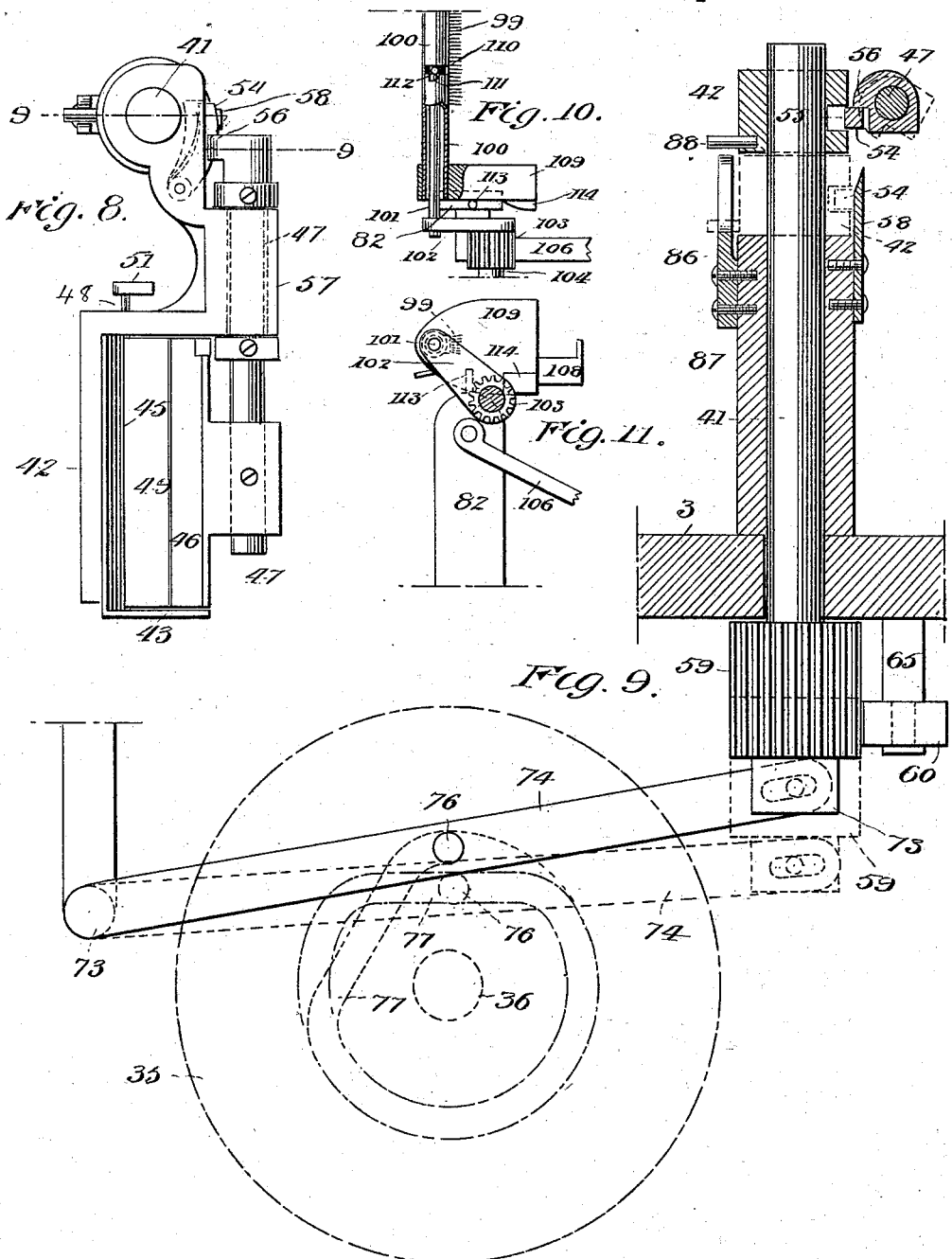

United States Patent Office.

GEORGE F. CARLIE, OF NEW YORK, N. Y., ASSIGNOR OF THREE-FIFTHS TO DAVID BUCHNER, OF SAME PLACE.

CIGARETTE-MACHINE.

SPECIFICATION forming part of Letters Patent No. 546,063, dated September 10, 1895.

Application filed February 28, 1895. Serial No. 539,959. (No model.)

*To all whom it may concern:*

Be it known that I, GEORGE F. CARLIE, a citizen of the United States, residing at New York city, county and State of New York, have invented certain new and useful Improvements in Cigarette-Machines, of which the following is such a full, clear, and exact description as will enable any one skilled in the art to which it appertains to make and use the same, reference being had to the accompanying drawings, forming part of this specification.

My invention relates to machines for making individual cigarettes in contradistinction to those for making a continuous cigarette and severing it into the requisite lengths.

While my improvements are particularly well adapted for making all-tobacco cigarettes in completed form, nevertheless certain features of the invention may be used with advantage in other forms of cigarette-making machines.

The invention consists in the various novel and peculiar arrangements and combinations of the several parts of the machine, all as hereinafter fully described, and then pointed out in the claims.

I have illustrated a type of my invention in the accompanying drawings, wherein—

Figure 1:
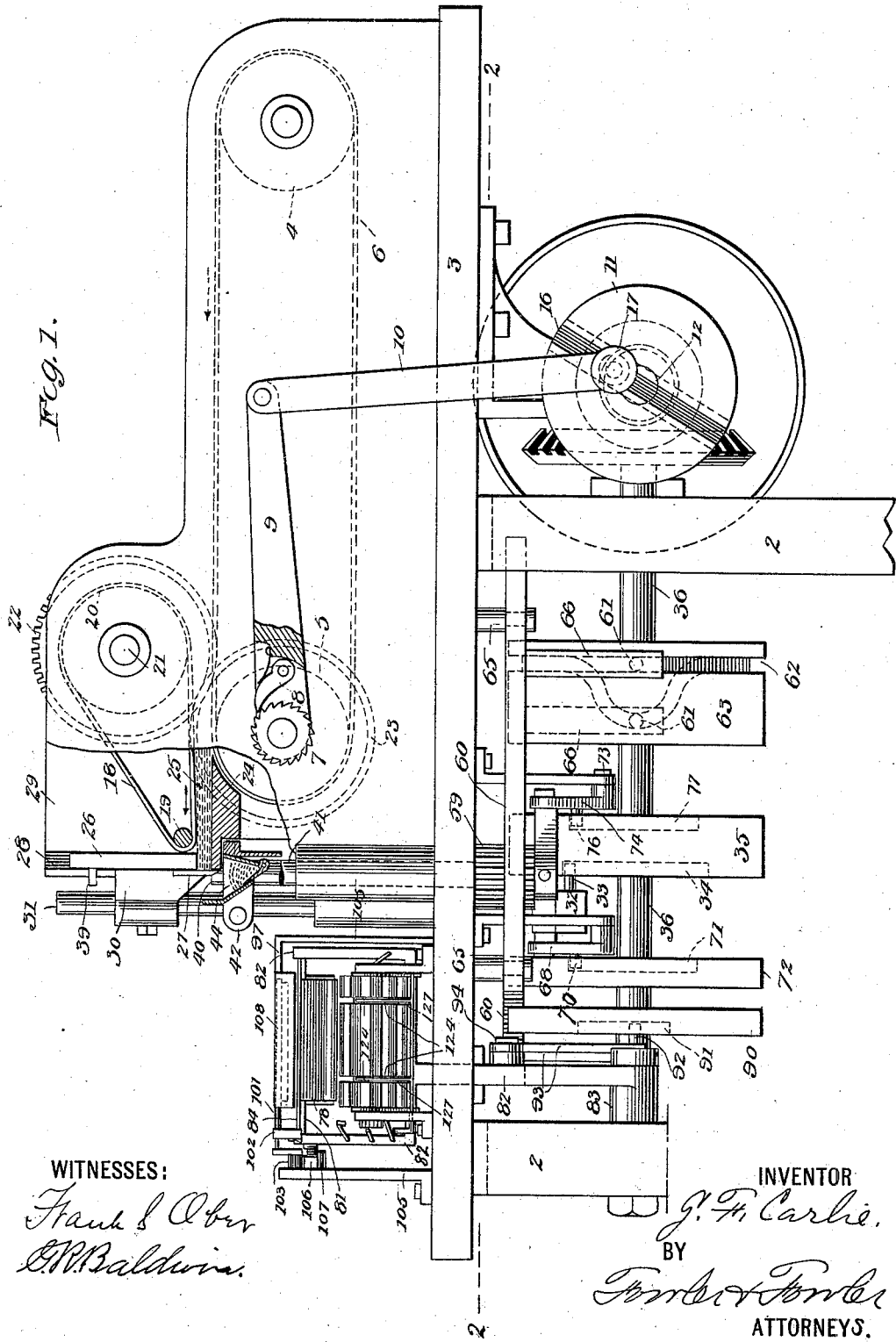
Figure 2:
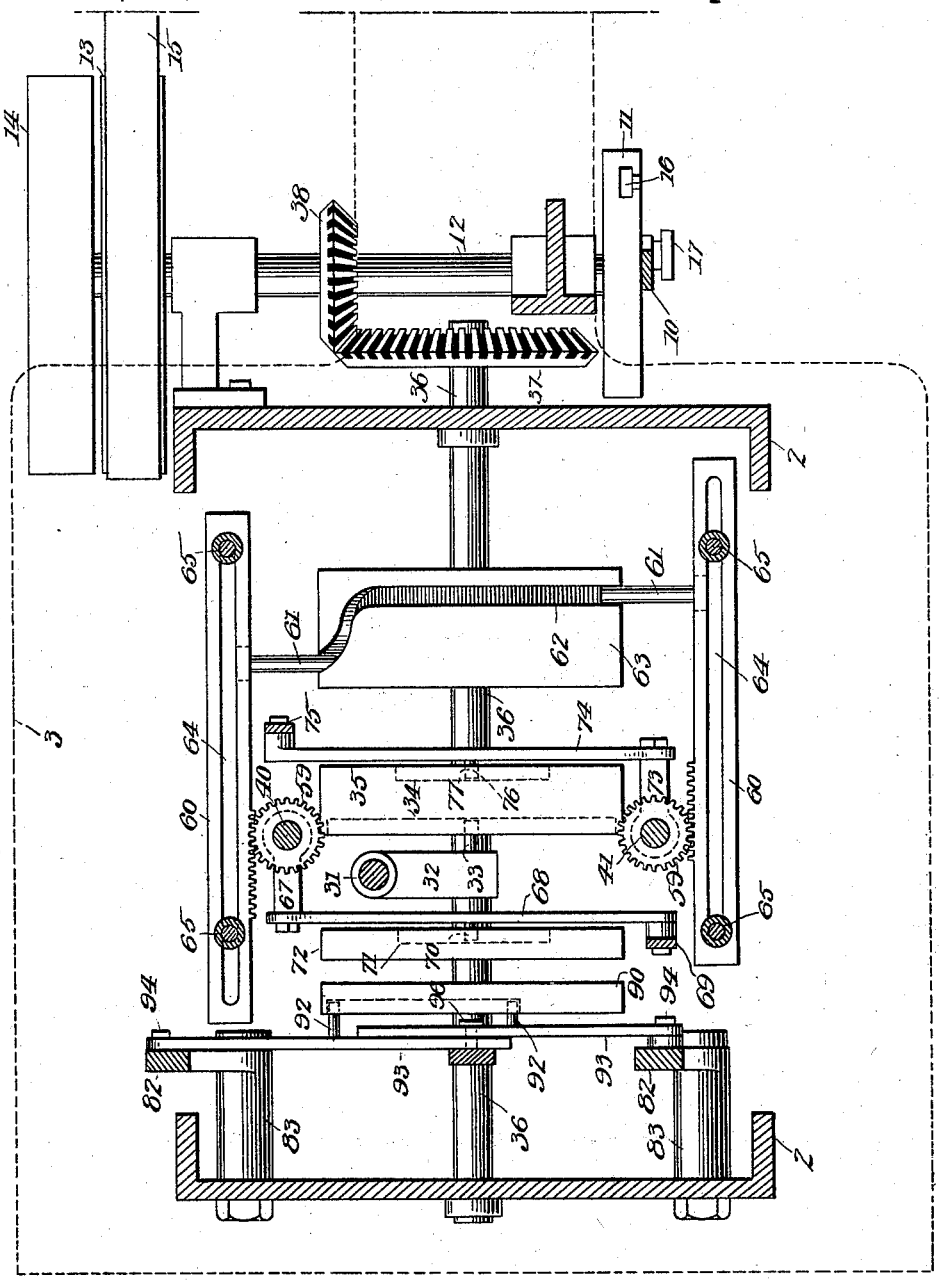
Figure 4:
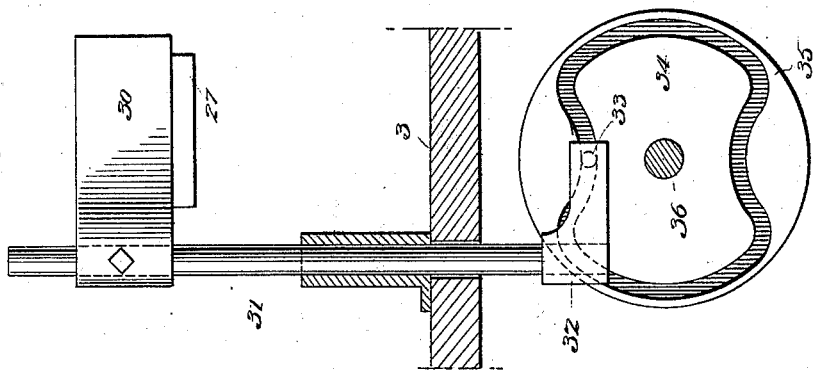
Figure 3:
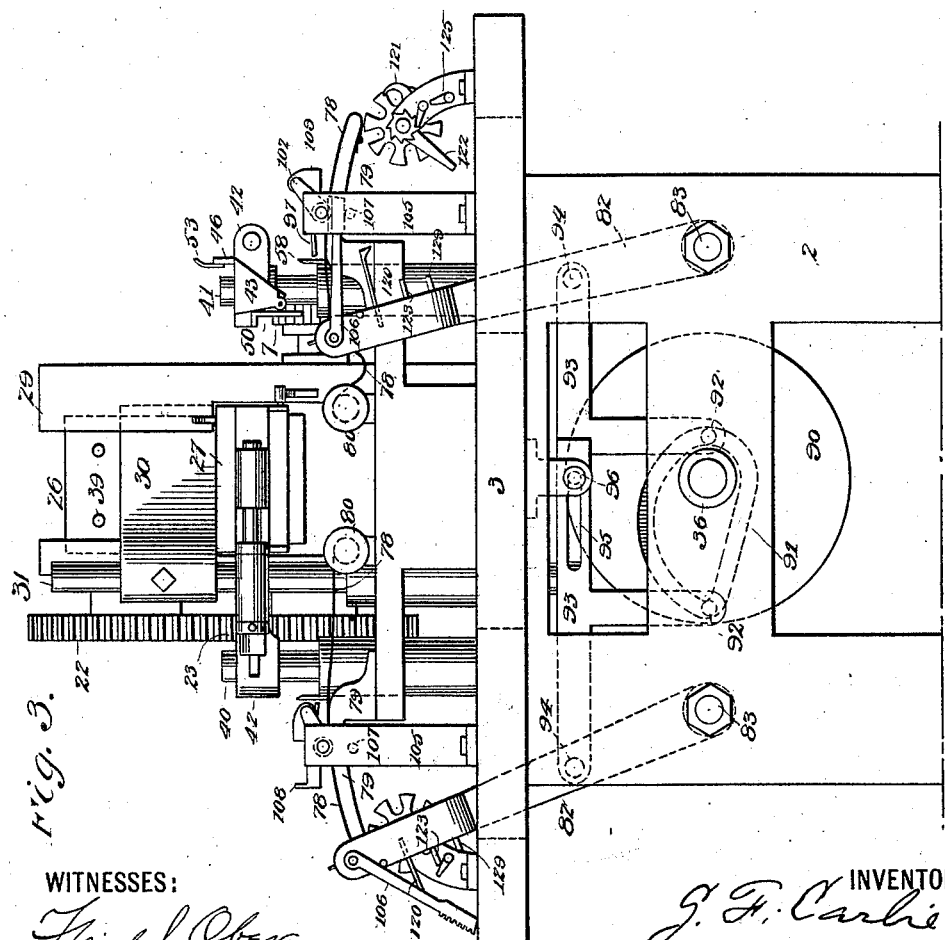
Figure 5:
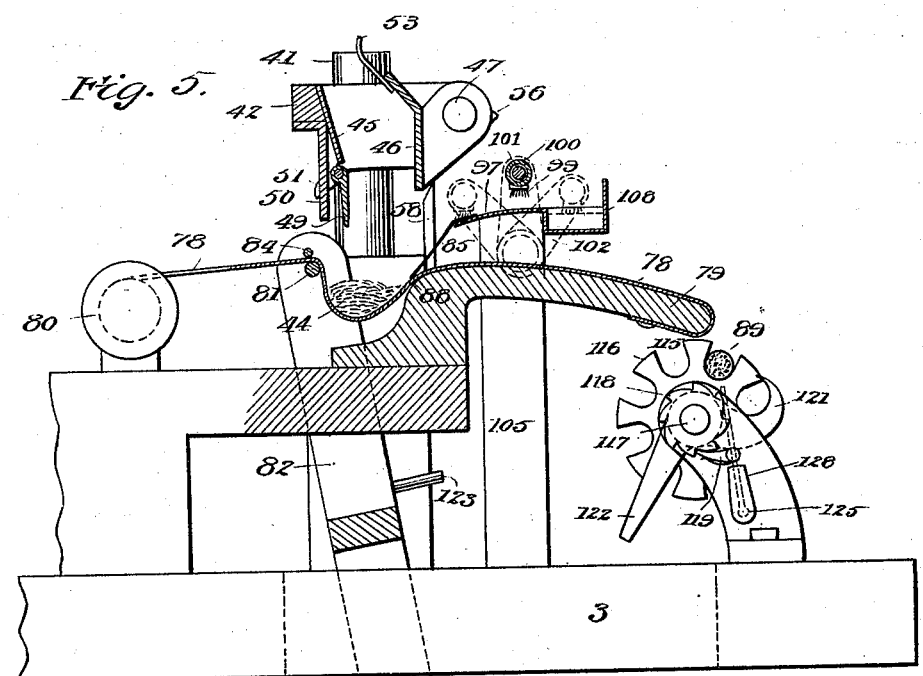
Figures 6, 7:
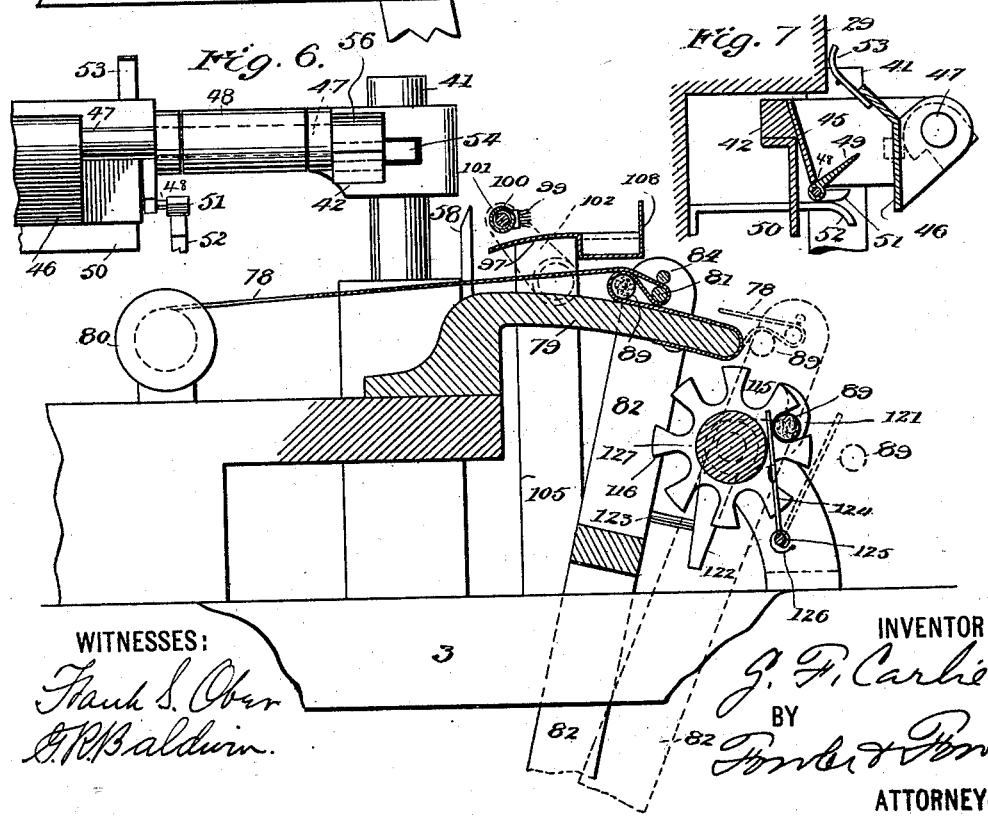

Figure 1 is a side view of a machine embodying my improvements, a portion of the machine being represented as broken away in order to show more clearly parts of the details thereof. Fig. 2 shows a horizontal section taken on a plane indicated by line 2 2, Fig. 1, the dotted lines indicating the horizontal platform or table of the machine-frame. Fig. 3 is an end view of the machine. Fig. 4 is an enlarged detail view of the reciprocating knife for cutting off the filler-tobacco, together with its actuating-cam. Fig. 5 is an enlarged detail view, partly in vertical section, showing the relative positions of the several parts of the filler-carrier, the rolling, pasting, and cutting devices after the carrier has been lowered so as to depress the rolling-apron and automatically deposit thereon its charge of filler-tobacco and then raised clear of the same ready to be swung back to the feeding device and at which time the rolling action is just beginning to take place. Fig. 6 is a similar detail view to that shown in Fig. 5, but with a change in the positions of the several parts. In this view the rolling action has progressed so far as to place the wrapper about the filler and the filler-carrier has been swung back through a quarter of a circle and has been closed up ready for the reception of another charge. The cutter has just completed the trimming of a previously-rolled cigarette and the pasting device has been turned out of the way. The parts represented in dotted lines in this view show the extreme limit of movement of the rolling-lever and its roller after it has drawn the apron out, so as to destroy the bight and eject the rolled cigarette. Fig. 7 is a transverse vertical section of one of the filler-carriers shown as just swinging into position under the feeder and about to be closed up before receiving a charge. Fig. 8 is a plan view of one of the filler-carriers closed up. Fig. 9 is a large detail view of the vertical rock-shaft for actuating the filler-carrier mounted thereon, showing the pinion and rack for rocking the shaft, and also showing the cam for vertically reciprocating the shaft, the plane of the section upon which this view is taken being indicated by lines 9 9, Fig. 8. Fig. 10 is a plan view of the paste-brush and its arm and pinion, and Fig. 11 is a side view of the same.

Referring to the drawings, in which like numbers of reference indicate like parts throughout, 2 is the framing of the machine, supporting a horizontal platform or table 3, upon which is mounted in suitable bearings a pair of horizontally-arranged rollers 4 and 5, between which is stretched an endless feed-belt 6, which may be made of any desired length. The endless belt 6 is driven by the positive motion of the roller 5, which is moved on its axis step by step through means of a ratchet 7, engaged by a spring-pawl 8, carried upon the swinging arm 9, which is loosely mounted on the axle or shaft of roller 5. The swinging arm 9 is connected by means of rod 10 with the eccentric or disk 11, driven by main shaft 12, which carries at its opposite end a fast pulley 13 and a loose pulley 14, which are engaged by the driving-belt 15. This disk 11 is provided with a diametrically-arranged groove 16, in which takes a binding-screw or fastening device 17, carried by the connecting-rod 10. By this means the throw of the eccentric motion can be regulated by adjusting the binding-screw 17 along the groove of the disk, and accordingly the throw of the ratchet-arm 9 may be regulated. In this way the movement imparted to the roller 5 may be increased or decreased at each revolution of the main shaft, and the feeding of the filler-tobacco, which is primarily controlled by the endless belt 6, may at will be correspondingly increased or decreased, as the requirements may demand.

Above the endless belt 6 and at the delivery end thereof is arranged another endless belt 18, which passes around a guide-roller and a driving drum or roller 20, upon the shaft 21 of which is secured a cog-wheel 22, which gears with and is driven by a cog-wheel 23, mounted upon the axle of the step-by-step-actuated roller 5. This upper feed-belt 18 is adjusted so that its lower stretch is slightly out of parallel with the upper stretch of the lower belt, in order that the filler-tobacco as it is brought along by the upper stretch of the lower belt may be drawn in between the two belts with slightly-increasing pressure and thereby gradually squeezed into compact form by the time it is carried onto the pressing and cutting block 24, which is arranged beyond the delivery end of the lower belt and overhangs the roller 5, so as to form a practically-unbroken continuation of the upper stretch of belt 6. The upper belt 18 extends over the block 24 for a considerable distance, and the simultaneous movement of the two belts pushes the layer of filler-tobacco onto the block and thence along it. The action of the upper belt 18 upon the upper surface of the layer of filler-tobacco, which is indicated by the number 25, also serves to feed the same along the block 24 to its outer end, where it is held down by a presser 26 while being cut off by the reciprocating knife 27. These feeder-belts are made of a width at least as great as the length of the bunch of filler-tobacco, likewise the passage-way along which the tobacco passes to the presser, which consists of a heavy plate (made of metal, for instance) and mounted so as to be easily movable in vertical grooves or guides 28, arranged upon the side pieces 29 of the framing. The knife 27 is set in a head piece 30, carried upon a vertically-reciprocating rod 31, having at its lower end a block 32, in which is set a pin 33, which projects into cam-groove 34 of the cam 35, which is continually rotated by the shaft 36, extending along under the table or platform 3 of the machine. This shaft 36 receives its motion from the drive-shaft 12 through means of the beveled gears 37 and 38, mounted, respectively, upon shafts 36 and 12. Each revolution of cam 35 causes the knife 27 to rise and fall twice, thereby making two cuts. When the knife is raised the head-piece 30 thereof comes in contact with two pins 39, projecting from the front face of the presser 26, and serves to raise the plate clear of the layer of filler-tobacco which is then moved forward by the feed-belts in a compact layer a sufficient distance beyond the plane of the raised knife to allow it to cut off a predetermined quantity of the tobacco to constitute a charge for a cigarette. This feeding movement of the filler-tobacco takes place after the knife has been raised and has carried up with it the presser and both of these devices remain elevated while the layer is moved forwardly and until such movement ceases, whereupon the movement of the knife is so timed as to cause it to descend. As the knife descends the presser gravitates down after it, and by the time the blade reaches the tobacco that is to be cut the presser has come in contact with the same and holds it firmly while the knife cuts through it. As before stated, the distance through which the layer of filler-tobacco is fed at each step of the intermittent motion depends upon the range of movement of the pawl carrier or arm 9 and this latter is determined by the adjustment of the binding-screw 17 in the T-groove of eccentric 11. It will thus be seen that the amount of tobacco which a charge is to contain can be at will regulated to a nicety by the adjustment referred to. As the charge of filler-tobacco is cut off by the knife 27 it falls into one of the two swinging receptacles or carriers which is at such time at rest beneath the knife. There are two of these filler-carriers, which are constructed alike and are each arranged to be swung through an arc of about forty-five degrees by means of the vertically-reciprocating rock-shafts 40 41, respectively—that is, each of the rock-shafts, which are arranged one at each side of the delivery end of the feed device, is provided with one of the carriers and the latter are adjusted relatively, so that while one carrier is at rest beneath the knife, where it receives its charge, the other is in position over its rolling device, and vice versa. These carriers are constructed substantially alike and each comprises a frame 42, which is fixed upon its rock-shaft and projects horizontally therefrom. At the outer end of the frame 42 is an open-top receptacle 43, that is suitably shaped to readily receive the charge of filler-tobacco 44 as it falls from the knife. (See Fig. 1.) One of the long sides 45 of the receptacle is slightly inclined and is stationary, while the opposite long side 46 is secured to a shaft 47, mounted horizontally in frame 42, and it tends to swing down into open position, as shown in Figs. 5 and 7.

At the lower end of side 45 is mounted a shaft 48, carrying a flap or section 49, which overlaps the inner face of the swinging side 46, which stands in inclined position when closed, as shown in Figs. 1 and 8. By this construction there is thus constituted a receptacle that is V-shaped in cross-section and which thereby tends to keep the charge of filler-tobacco compactly together, and the charge is further prevented from unduly spreading or falling apart when dropped by the carrier by virtue of the peculiar action of the hinged flap 49, by which the contents of the carrier are finally slid or placed onto the rolling-apron hereinafter described. This construction of the carrier also causes it to deposit its charge a considerable distance away from and hence clear of the depressing member 50, which is mounted upon the carrier and serves to depress the rolling-apron just before the carrier deposits the charge in the pocket thereof, as will be described farther on.

The bottom of the carrier or receptacle 43 is automatically closed as it is swung into position under the knife by means of a lug 51, which is carried by the hinged flap 49, riding over a fixed piece 52, and thereby swinging the hinged flap 49 from the position shown in Fig. 5 to that shown in Fig. 7. After this has occurred the further inward swinging of the carrier brings an arm 53 of the hinged side 46 against the framing 29 and serves to move the side piece into the closed position, as shown in Figs. 1, 3, and 8. When thus closed it is held locked by means of a spring-latch 54, which is set in recess 55 of frame 42, snapping under a projection 56 upon the end of the shaft 47, which carries the side piece 46 and which is loosely mounted in a bearing 57 of frame 42, as will be readily understood from Figs. 6, 8, and 10. This spring-latch 54 keeps the bottom of the carrier locked in closed position until the carrier is swung through a quarter of a circle and brought over the rolling device and is caused to descend in order to deposit the charge of filler-tobacco. During such descent the spring-latch 54 is tripped open by a fixed finger 58, and the carrier thereby caused to drop the charge. These two carriers are fixed upon their respective rock-shafts in such relative adjustment that they stand about at right angles to each other when at rest, and they are swung in alternation back and forth through a quarter of a circle, between the feeder on the one hand and the rolling device on the other. Each rock-shaft is periodically moved on its axis by means of a pinion 59, fixed upon the lower end thereof, and a horizontally-reciprocating rack 60, which is kept in mesh with the pinion, being actuated by cam 63, driven by shaft 36, the said cam having a cam-groove 62, which acts upon a pin 61, projecting inwardly from a fixed arm 66, which extends downwardly from the rack. Each rack is mounted so as to be capable of endwise reciprocation by means of longitudinal slot 64 formed therein and riding over fixed rods 65, depending from the under side of the table 3. These racks and their actuating mechanism are so adjusted relatively that when one of them is at its extreme limit of movement in one direction the other is at its extreme limit of movement in the other direction, and as one rack is moved outwardly the other is moved inwardly, and this alternate reciprocation serves to swing one of the carriers from the feeder over to its rolling device, at which time the other carrier moves from its rolling device over to the feeder, and so on throughout the operation of the machine. The arcs described by the carriers, respectively, in their swinging movements intersect each other, as will be understood more especially from Figs. 2 and 3, they being adjusted so that each one can be brought into the same position under the feeder in order to receive its charge.

The formation of the pocket in the apron of the rolling device by which the cigarette is finally rolled is effected by a downward movement of the carrier when brought over the apron and the carrier is then automatically raised before being swung back to the feeder. This vertical movement of the carriers is provided for in the present construction by a vertical movement of the rock-shafts upon which the carriers are mounted. The lower end of rock-shaft 40 is provided with bracket 67, to which is loosely connected the lever 68, swinging on a fixed center 69, and near the center of the length of this lever 68 is arranged a fixed pin 70, that is acted upon by cam-groove 71 of a cam 72 mounted upon shaft 36. This cam-groove 71 is shaped so that at the proper time it will draw down the lever 68 and thereby cause the connected rock-shaft to descend and remain down for a short period. The upward movement of the lever moves the rock-shaft up with it and the latter is caused to remain in such position while the rack and pinion come into play and swing the carrier over to the feeder and returns it to the rolling device after having received its charge from the feeder. This operation is repeated by each of the carriers in alternation, the other rock-shaft 41 being operated similarly to the manner just described by means of bracket 73, lever 74 moving on a fixed center 75 and provided with pin 76, which takes into the cam-groove 77 formed upon one side of cam 35, which has already been described. This cam 35 takes the place of two independent cams, since its opposite faces are each provided with a cam-groove. This merging of two cam-bodies into one serves to economize space, though it is obvious that two independent cams, may be used instead of the single one. At the time that the rock-shaft of the carrier is caused to descend and rise again the connected rack 60 is at rest, so that the pinion 59 gearing therewith can be readily reciprocated across the rack, and for this purpose the pinion is made considerably wider than the rack, as will be clearly understood from Figs. 1 and 9.

Each carrier works in conjunction with a rolling device, the apron 78 of which is placed with its length at right angles to the direction in which the filler-tobacco is fed, though the angle at which the apron is arranged will depend upon the number of degrees of a circle through which the carriers are swung. In the present construction the carriers are moved through a quadrant and hence the arrangement of the rolling-apron at right angles to the line of feed. At one end the rolling-apron 78 is made fast under the outer and delivery end of the rolling-table 79, over the upper face of which it loosely extends, the other end of the apron being fastened to a take-up roller or adjusting device 80, by means of which the length of the apron, and consequently the slack thereof, is regulated. During the action of the machine the ends of the rolling-apron are held fast, and it is depressed and formed into a pocket by the fixed member 50, depending from the carrier and which has already been referred to. As the carrier descends with its charge after being brought over the apron, the fixed member 50 first encounters it and depresses the apron until all the slack thereof is drawn into the pocket, whereupon the carrier automatically drops the charge 44 in the pocket and rises again. At this time the parts stand in the positions shown in Fig. 5, the apron being drawn taut over its table by the formation of the pocket. The rolling operation of the apron after being thus formed into the pocket is performed by means of a roller 81, extending transversely beneath the apron, and which is mounted across the forked end of a vibrating lever 82, moving on a fixed center 83. This forked end of the rolling-lever spans the rolling table and apron and carries, also, a fixed bar 84, which extends parallel with the roller 81 and is spaced therefrom a sufficient distance to allow the apron to slip easily between them. The roller 81 acts upon the under face of the apron and the rod 84 upon the upper face thereof, and the roller is adjusted so that in passing over the rolling-table 79 there is always sufficient space between the two to admit of a double thickness of the apron moving between the roller and the table, as will be understood from Fig. 6. The upper or working surface of the rolling-table is in the main part curved on an arc struck from the center of movement of the rolling lever 82, so that the roller 81, as it sweeps over the table, maintains practically a uniform distance therefrom. The sweep of the rolling lever is limited, on the one hand, to the full-line position shown in Fig. 5, and, on the other hand, to the broken-line position of Fig. 6. As the rolling lever moves outwardly from the position shown in Fig. 5, the inner portion of the rolling-apron lying to the rear of the roller—that is, between it and the take-up device 80—is kept taut by the drawing action exerted thereon by the loosely-mounted roller, and thus it gradually closes up the pocket to form the bight containing the charge, which it then begins to roll, so that by the time the roller has dragged the loop over to the table the filler is made into substantially a cylindrical form and is in shape to receive the tobacco wrapper 85, which has been previously placed in proper position across the apron, as shown in Fig. 5. As the filler is thus rolled along by the folded apron, the wrapper is drawn into the bight and wrapped around the filler as the same is rolled along by the apron, the traveling bight of which being now over the table causes a certain amount of pressure to be exerted upon the wrapped charge by virtue of the tension exerted on the apron between the roller 81 and the take-up device 80. When the rolling lever 82 has swung to the outer end of the table and begins to move beyond that point, the apron is drawn upon sufficiently to take up most of the slack, so as to destroy the bight therein, in which the rolled cigarette has been carried along, and thereby eject the same, as will be understood from the broken-line part of the view in Fig. 6. After the rolled cigarette has been thrown out from the apron the rolling lever and its roller and rod are moved back over the table and beyond the same into the position shown in Fig. 5, when it is again ready to move forward to repeat the operation just described, after the apron has been formed with the pocket by the descent of the carrier and the filler deposited therein. In order to insure the carrier being brought into true position above the apron before depositing its contents thereon, I provide the same with a guiding device comprising a forked upright 86, mounted in fixed position upon a sleeve 87, which is fixed upon the platform 3 and surrounds a portion of the rock-shaft of the carrier, and a projection or pin 88, located upon the frame 42 of the carrier, the two parts 86 and 88 being so adjusted that when the rock-shaft descends the projection 88 is received by the forked member 86 and causes the carrier to be brought into its proper position across the apron by the time it is ready to deposit the filler thereon.

The rolling lever 82 receives its motion from the shaft 36 through means of cam 90, having a peculiarly-shaped cam-groove 91, acting upon pin 92, which is carried by a horizontally-sliding frame or member 93. This member 93 is pivoted at 94 to the rolling lever and is formed with a slot 95, working over a pin 96, which serves to guide the member in its movement and to support it, at the same time permitting a slight rocking motion of the same.

The several described parts of the rolling device are the same in each of the two devices, and the cam 90 for actuating them is so shaped that as the carrier begins to move from the feeder to the rolling device the rolling lever, which acts in conjunction with such carrier, being then at its outer limit of movement, starts inwardly and reaches the end of its instroke by the time the carrier arrives over the apron. The two rolling levers and their adjunct are, of course, actuated in reverse order—that is to say, one makes an outstroke while the other makes an instroke, in order to co-operate with the alternately-swinging carriers. The wrapper 85 is of the usual rectangular shape and is placed by hand in the position shown in Fig 5, with its upper end resting upon a shelf or bridge-like support 97, arranged a suitable distance above the apron, and with its lower end resting upon the rolling-apron and, preferably, at a point thereof where the table 79 curves downwardly, as at 98. One of the long edges of the wrapper is automatically gummed or supplied with paste just after being placed in position by means of a paste-brush 99, having a tubular handle 100, into which extends a rod 101, carried by a swinging arm 102, which is periodically moved through a quarter of a circle by a pinion 103, mounted on a stud 104, which projects inwardly from a standard 105. Upon the rolling-lever 82 is pivoted a swinging toothed arm 106, which upon the instroke of the rolling-lever is drawn over a pin 107, projecting from the inner face of standard 105, and the teeth of this arm are thereby brought into mesh with the pinion 103 and upon the under side thereof, and the pinion is thus given a quarter of a revolution. This action of the pinion upon the instroke of the adjacent rolling lever causes the brush to move from the left-hand dotted-line position (shown in Fig. 5) to the right-hand dotted-line position, in which latter position the brush is caused to dip into the paste or gum in the tank 108. The tubular handle 100 of the brush is provided with a counterweight 109, so that when the brush is free to turn on its rod 101 this weight will cause it to assume a position in which the bristles of the brush will project downwardly, which is the case when the brush is brought over the tank and also when it is brought against the edge of the wrapper 85, as shown in Fig. 5. The brush is then given a quarter-turn on its axis, so as to wipe the paste on the wrapper and to get the paste-charged bristles out of the way in order to prevent them from daubing the paste on the shelf or rest 97, and then lock it in such position as it is being carried back to the paste-tank and upon its reaching there unlock it. This is accomplished in the following way: The tubular handle 100 is provided with a slot 110, having a notch 111, formed at one side thereof, and in this slot works a pin 112, projecting from the rod 101, which extends in the handle of the brush. The brush has a slight endwise movement on the rod 101 in addition to its rotary movement thereon, so that when the rolling-lever 82 in its outstroke meets the depending weight 109 it swings it aside and passing thereunder elevates it, so as to turn the brush, thereby giving the wrapper a wipe and bringing the bristles into horizontal position, whereupon a pin 113 upon the head of the lever 82 strikes a cam-like projection 114 on the weight and moves the brush along the rod 101 sufficiently to cause the notch 111 to receive the pin 112, and thereby lock the brush in the position shown in Figs. 10 and 11. When, now, upon the instroke of the rolling-lever the toothed arm 106 engages the pinion 103 and thereby throws the brush over to the paste-tank, the brush is released by the disengagement of the notch 111 from the pin 112, and the weight 109 is free to turn so as to bring the bristles of the brush in vertical position over the paste, into which it dips.

After the rolled cigarette (indicated by the number 89) is carried beyond the end of the rolling-table and dropped from the apron (see Fig. 6) it falls into a recess or rack 115 of the rotating drum or frame 116, which is given a partial turn on its arbor 117 as the rolling-lever 82 is about to complete its outstroke. Upon one end of the arbor 117 is a fixed ratchet 118, having a spring-dog 119 for locking it against rotation in one direction. As the rolling-lever approaches its outward limit of movement, a projection or finger 120 thereon (see Fig. 3) engages the uppermost tooth of ratchet 118 and moves the latter sufficiently to turn the cutter-drum 116 one-eighth of a revolution—that is, from the position shown in Fig. 5 to that shown in Fig. 6. This movement carries the rolled cigarette 89 previously deposited in the cutter-drum toward the knives 121, one of which is located at each end of the drum and closely against the same, each one serving to trim off the projecting end of the cigarette. Each of the knives 121 is pivoted to swing on the arbor 117 of the cutter-drum, and has a handle 122, which lies in the path of a projection 123, located on the prong of the forked head of the rolling-lever 82. The blade of each of the knives curves inwardly and gives a shearing cut when brought into operation as the rolling-lever moves outwardly, and projection 123 thereof pushes upon the handle of the knife, as shown in Fig. 6. In the present construction the cutter-drum 116 consists of a solid cylinder formed with a series of peripheral grooves or recesses 115, which extend parallel with the axis of the cylinder and throughout its length. The grooves are U-shaped in cross-section and give a firm bearing to the rolled cigarette as it is being trimmed at each end by the knives.

After the ends of the rolled cigarette have been trimmed it is ejected from the cutter-drum by means of two fingers 124, which are fixed upon a small shaft 125, provided with a spring 126, normally tending to hold the shaft in position to keep the pair of fingers 124 back within the circumferential grooves 127 formed in the drum, so that normally the fingers lie to the rear of the untrimmed cigarette. (See Figs. 1, 5, and 6.) These fingers 124 serve to push the cut cigarette out of the rack of the drum in which it is located and immediately after it has been cut with the knife. This movement of the fingers is brought about by the partial turning of shaft 125 by means of a fixed arm 128, carried upon one end of the shaft, and which is acted upon and pushed outwardly by a projection or pin 129, located upon the rolling-lever 83. (See Figs. 1 and 3.)

From the foregoing description of my improved machine its operation will be readily understood. The loose filler-tobacco is deposited upon the upper stretch of the endless feed-belt 6, either by hand or by means of an ordinary hopper. This belt by its intermittent motion carries the filler-tobacco in a layer that is practically uniform in thickness to the upper belt 18, and this layer of tobacco is drawn in between the two belts under a gradually-increasing pressure, and by their combined action it is pushed along to the presser and knife. When the knife cuts off a secit is evident that various modifications may be made in the several parts of the machine without making a substantial departure from the scope of my invention.

Though I have referred to the wrapper 85 as being made of tobacco, nevertheless paper wrappers may be used instead when it is desired to make a paper cigarette.

It will be observed that my invention is not limited to any particular way of supplying the charge of tobacco to the carriers or to any particular means or mechanism for doing the same, and in using the terms "feeder" and "feeding mechanism or device" it is done with the intention of including any suitable the same may be depressed to form the rolling-pocket and suitable means for producing said movements.

6. In a cigarette-making machine, the combination of a tobacco feeder adapted to deliver at intervals a charge of filler-tobacco, a rolling-device provided with a rolling-apron for placing the wrapper about a charge of filler-tobacco, a carrier constructed to swing in an arc about a vertical axis back and forth between said feeder and rolling-device for conveying a charge of filler-tobacco from the former to the latter and depositing it thereon, said carrier adapted to move vertically and to descend when over the rolling-apron to depress the same to form a rolling-pocket and suitable means for producing said movements.

7. In a cigarette-making machine, a rolling-device for placing a wrapper around a charge of filler-tobacco, and a carrier for receiving a charge of the tobacco and depositing it on the rolling-device, and means for operating the same said carrier comprising a receptacle having a bottom formed of overlapping movable sections adapted to open simultaneously when brought over the rolling-device to deposit its contents upon the same in compact form and means for opening and closing said sections.

8. In a cigarette-making machine, a rolling-device for placing a wrapper around a charge of filler-tobacco, and a carrier for receiving a charge of the tobacco and depositing it on the rolling-device, and means for operating the same, said carrier comprising a receptacle having a bottom formed of swinging overlapping movable sections adapted to open simultaneously when brought over the rolling-device to deposit its contents upon the same in compact form, and means for opening and closing said sections.

9. In a cigarette-making machine, a rolling-device for placing a wrapper around a charge of filler-tobacco, and a carrier for receiving a charge of the tobacco and depositing it on the rolling-device, and means for operating the same said carrier comprising a receptacle having a bottom formed with two depending sections, one fixed and the other hinged, and adapted to be brought together at an angle to each other, and a section or flap hinged to the lower edge of said fixed section and adapted to overlap the hinged section when closed up, so that when the sections are swung open the contents may be deposited thereby in a compact form and means for opening and closing said sections and flap.

10. In a cigarette-making machine, the combination of a feeder for supplying filler-tobacco and a rolling-device for placing the wrapper around the filler-tobacco, a carrier traveling to and fro between said feeder and rolling-device for conveying the charge of filler-tobacco from the former to the latter and comprising a receptacle having a fixed bottom section provided with a hinged flap, a hinged section upon which the flap overlaps when folded up, a trip-device for raising up the flap and then closing the hinged section as the carrier moves under the feeder to receive a charge of filler-tobacco therefrom, and means for automatically swinging the section and flap open to deposit the charge upon the rolling-device.

11. In a cigarette machine, tobacco feeding and rolling mechanisms, a carrier traveling between said feeding and rolling mechanisms and means for moving the same, said carrier comprising a receptacle having the bottom provided with a swinging section, a horizontally-disposed shaft upon which said section is mounted, said shaft being provided with a spring latch, and means for keeping the latch locked as the carrier moves from the feeder to the rolling-mechanism and then releasing the latch to open said section.

12. The combination of a rolling-device for placing a wrapper around a charge of filler-tobacco, a rotary step-by-step actuated drum or frame arranged with its axis horizontal and provided with peripheral recesses or racks for receiving a rolled cigarette, a knife arranged near each end of said drum or frame for cutting the ends of the rolled cigarette when deposited on the drum or frame, and means for pushing the cigarette from its recess or rack after being cut by the knives.

13. The combination of a paste-tank, a swinging arm or member and mechanism for freely swinging the arm back and forth on a horizontal axis, a brush loosely mounted on said arm or member and hanging with its bristles projecting downwardly when free to swing, and means for permitting the brush to swing free and turning it aside and holding it in the latter position as it is returned to the paste-tank.

14. A pasting-device comprising a paste-tank, a swinging arm or member and a pinion moving in fixed relation therewith for swinging said arm, a rack for periodically turning said pinion and means for moving said rack, a paste-brush loosely mounted on said swinging-arm and means for permitting it to swing free after it moves away from the paste-tank and then turning it aside and holding it in such position as it returns to the paste-tank.

15. The combination of a paste-tank, a rest or support for the cigarette-wrapper, a paste-brush traveling between the paste-tank and the support for applying the paste to the wrapper, said brush being adapted to be turned on its axis and locked in such position while being returned to the paste-tank and then released, and means for producing such movements.

16. The combination of a paste-tank, a rest or support for the cigarette-wrapper, a paste-brush traveling between the paste-tank and the support for applying the paste to the wrapper, a swinging arm or member having a fixed-rod mounted thereon provided with a locking-pin, a paste-brush having a handle formed with a locking-notch for receiving said

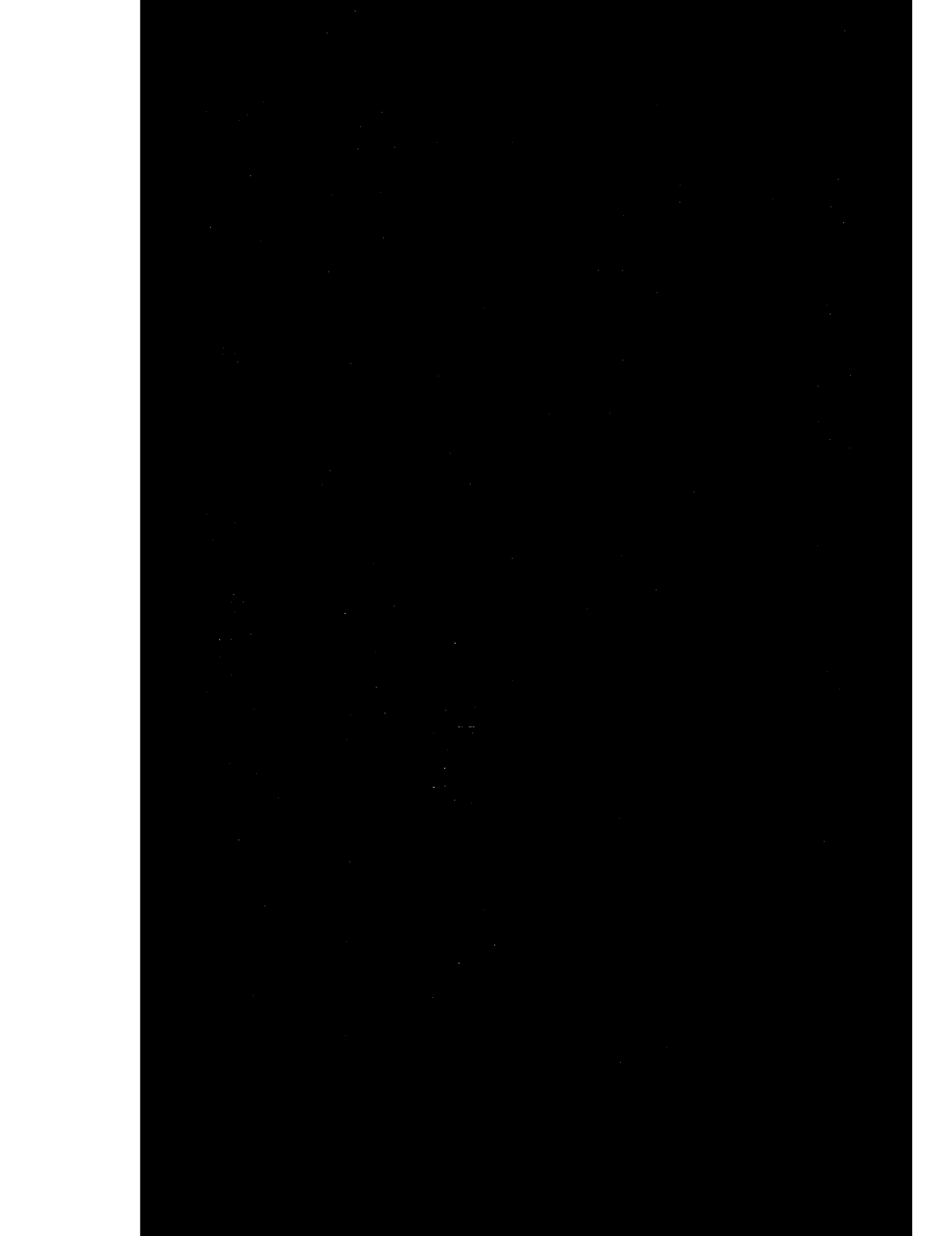

latter, and a plurality of horizontally-swinging carriers provided with means for moving them in opposite directions between said feeding-mechanism and said rolling-mechanisms.

27. In a cigarette machine, tobacco supplying or feeding mechanism, a plurality of rolling-mechanisms and means for operating the latter, a plurality of swinging-carriers for receiving the tobacco from the feeding-mechanism and conveying it to the rolling-mechanisms, and means for alternately swinging said carriers in opposite directions between said feeding-mechanism and said rolling-mechanisms.

28. In a cigarette machine, tobacco supplying or feeding mechanism, a plurality of rolling-mechanisms and means for operating the latter, oppositely moving carriers each traveling between said feeding-mechanism and its respective rolling-mechanism for receiving the tobacco from the one and delivering it to the other, said carriers being provided with shafts for effecting the said movements.

29. In a cigarette machine, tobacco supplying or feeding mechanism, a plurality of rolling-mechanisms and means for operating the latter, and a plurality of traveling-carriers each moving back and forth between said feeding-mechanism and its respective rolling-mechanism in alternation and means for causing said carriers to move alternately between said feeding and rolling mechanisms.

30. In a cigarette machine, tobacco feeding-mechanism, a plurality of rolling-mechanisms and means for operating the latter, a plurality of traveling-carriers each receiving the tobacco from the feeding-mechanism, and conveying it to its respective rolling-mechanism, and means for moving the said carriers between said feeding-mechanism and said rolling-mechanisms.

In testimony whereof I have hereunto set my hand, this 26th day of February, 1895, in the presence of the two subscribing witnesses.

GEORGE F. CARLIE.

Witnesses:
D. BUCHNER,
WILLIS FOWLER.